United States Patent
Ji et al.

(10) Patent No.: US 12,298,384 B2
(45) Date of Patent: May 13, 2025

(54) SENSOR LAYOUT OF VEHICLES

(71) Applicant: Beijing Tusen Zhitu Technology Co., Ltd., Beijing (CN)

(72) Inventors: Pingyuan Ji, Beijing (CN); Jianan Hao, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/804,541

(22) Filed: May 27, 2022

(65) Prior Publication Data

US 2022/0381899 A1 Dec. 1, 2022

(30) Foreign Application Priority Data

May 28, 2021 (CN) .......................... 202110594439.1

(51) Int. Cl.

| | |
|---|---|
| *G01S 13/86* | (2006.01) |
| *G01J 5/08* | (2022.01) |
| *G01S 13/931* | (2020.01) |
| *G01S 15/86* | (2020.01) |
| *G01S 15/931* | (2020.01) |
| *G01S 17/87* | (2020.01) |
| *G01S 17/931* | (2020.01) |
| *H04N 23/90* | (2023.01) |

(52) U.S. Cl.
CPC .......... *G01S 13/867* (2013.01); *G01J 5/0859* (2013.01); *G01S 13/865* (2013.01); *G01S 13/931* (2013.01);

(Continued)

(58) Field of Classification Search
CPC ...... G01S 13/867; G01S 15/86; G01S 17/931; G01S 13/865; G01S 13/931;

(Continued)

(56) References Cited

U.S. PATENT DOCUMENTS

| | | |
|---|---|---|
| 2016/0282468 A1 | 9/2016 | Gruver et al. |
| 2020/0064483 A1* | 2/2020 | Li .......................... G01S 7/4026 |

(Continued)

FOREIGN PATENT DOCUMENTS

| | | |
|---|---|---|
| CN | 109373974 A | 2/2019 |
| CN | 210502571 U | 5/2020 |

(Continued)

OTHER PUBLICATIONS

United Arab Emirates, Ministry of Economy, Substantive Examination Result & Search Report for UA Appl. No. P6000928/2022, mailing date Oct. 10, 2024, 9 pages.

(Continued)

*Primary Examiner* — Boubacar Abdou Tchoussou
*Assistant Examiner* — Asmamaw G Tarko
(74) *Attorney, Agent, or Firm* — Perkins Coie LLP

(57) ABSTRACT

The present disclosure relates to a vehicle. The vehicle includes a first set of cameras, including a first subset of cameras facing to the front of the vehicle; a second set of cameras, with focal lengths less than those of the first set of cameras, the second set of cameras including a second and a third subset of cameras, the second subset of cameras facing to the front of the vehicle, and third subset of cameras facing to a side front and/or a side of the vehicle; and a third set of cameras, with focal lengths less than those of the second set of cameras, the third set of cameras including a fourth and a fifth subset of camera, the fourth subset of cameras facing to the front of the vehicle, and the fifth subset of camera facing to the side front and/or side of the vehicle.

19 Claims, 5 Drawing Sheets

(52) U.S. Cl.
CPC ............ *G01S 15/86* (2020.01); *G01S 15/931* (2013.01); *G01S 17/87* (2013.01); *G01S 17/931* (2020.01); *H04N 23/90* (2023.01)

(58) Field of Classification Search
CPC .................. G01S 15/931; G01S 17/87; G01S 2013/93271; G01S 2013/93272; G01S 2013/93274; H04N 23/90; G01J 5/0859
USPC ........................................ 348/148, 159, 47
See application file for complete search history.

(56) References Cited

U.S. PATENT DOCUMENTS

| | | | | |
|---|---|---|---|---|
| 2020/0172014 | A1* | 6/2020 | Takhirov | B60R 1/002 |
| 2021/0084235 | A1* | 3/2021 | Nie | G01S 13/931 |
| 2021/0124051 | A1* | 4/2021 | Lu | G01H 9/00 |
| 2021/0255329 | A1* | 8/2021 | Li | G01S 17/931 |
| 2022/0097661 | A1* | 3/2022 | Meng | B60W 30/0956 |
| 2022/0357441 | A1* | 11/2022 | Ansari | G01S 7/417 |

FOREIGN PATENT DOCUMENTS

| | | |
|---|---|---|
| CN | 112511736 U | 3/2021 |
| CN | 213262298 U | 5/2021 |
| EP | 3792657 A1 | 3/2021 |
| WO | 2021027401 A1 | 2/2021 |

OTHER PUBLICATIONS

European Patent Office, Extended European search report for EP 22175118.3, Mailing Date: Oct. 31, 2022, 13 pages.

Chinese Patent Office, First Office Opinion Notice for CN Appl. No. 202110594439.1, mailed on Jan. 19, 2025, 16 pages with English translation.

* cited by examiner

SENSOR LAYOUT OF VEHICLES

CROSS-REFERENCE TO RELATED APPLICATION(S)

The present disclosure claims priority to Chinese Patent Application No. 202110594439.1, titled "SENSOR LAYOUT OF VEHICLES", filed on May 28, 2021, the content of which is incorporated herein by reference in its entirety.

TECHNICAL FIELD

The present disclosure relates to a vehicle, and more particularly to a sensor layout of vehicles.

BACKGROUND

When a vehicle faces various driving environments, reliable perception of the surrounding environment is crucial for the vehicle to make correct and safe decisions, and especially in the field of autonomous driving, the perception ability has an important influence on autonomous driving. Cameras and the like are usually arranged on a vehicle to perceive environment information in the surrounding environment, and the cameras on the vehicle needs to be reasonably arranged to ensure that the environment information in the surrounding environment of the vehicle is reliably perceived in various driving environments, and the driving reliability of the vehicle is ensured.

SUMMARY

Disclosed is a vehicle capable of reliably sensing environmental information in a surrounding environment.

The present disclosure provides, in one aspect, a vehicle which includes a first set of cameras including a first subset of cameras facing to a front of the vehicle; a second set of cameras, where a focal length of the second set of cameras is less than a focal length of the first set of cameras, the second set of cameras includes a second subset of cameras and a third subset of cameras, the second subset of cameras face to the front of the vehicle, and the third subset of cameras face to a side front and/or a side of the vehicle; and a third set of cameras, where a focal length of the third set of cameras is less than the focal length of the second set of cameras, the third set of cameras includes a fourth subset of cameras and a fifth subset of camera, the fourth subset of cameras face to the front of the vehicle, and the fifth subset of cameras face to the side front and/or the side of the vehicle.

In another aspect, the disclosure provides a vehicle which includes: a first group of sensors, configured to perceive objects within a range less than a first distance and greater than a second distance from the vehicle; a second group of sensors, configured to perceive objects within a range less than a third distance and greater than a fourth distance from the vehicle; and a third group of sensors, configured to perceive objects within a range less than a fifth distance from the vehicle; where the first distance is greater than the third distance, the third distance is greater than or equal to the second distance, the second distance is greater than the fourth distance, and the fifth distance is greater than or equal to the fourth distance and less than the second distance and the third distance, and where a horizontal field of view of the first group of sensors is smaller than or equal to a horizontal field of view of the second group of sensors, and the horizontal field of view of the second group of sensors is smaller than or equal to a horizontal field of view of the third group of sensors.

The features of the above and other aspects of the disclosed technology are described in more detail in the drawings, description and claims.

BRIEF DESCRIPTION OF THE DRAWINGS

In the figures of the drawings, various embodiments are illustrated in an exemplary manner rather than a limiting manner.

If possible, the same reference sign has been used to specify the same element common in the figures. The elements disclosed in one implementation are expected to be beneficially used in other implementations without specific narration.

DETAILED DESCRIPTION

In the following description, for the purpose of interpretation, many specific details are set forth in order to provide thorough understanding of various embodiments. It is understood that other embodiments may be utilized and structural changes may be made without deviating from the range of the disclosed subject matter. Any combination of the following features and elements is contemplated to implement and practice the present disclosure.

In the specification, the same or similar features may be specified by the same reference sign. As used herein, "exemplary" may indicate examples, implementations, or aspects, and should not be interpreted as limiting or indicating preferences or preferred implementations.

At present, the vehicle faces a plurality of technical restrictions, especially in the field of autonomous driving, which hinder the interaction and adaptability of the vehicle in the real world.

Currently in the field of autonomous driving, autonomous driving technologies are typically reactive, that is, decisions are based on current conditions or states. For example, an autonomous vehicle may be programmed to emergently stop when an object in the middle of a road is detected. However, in the current autonomous driving technology, the perception ability and environment adaptability of a vehicle to objects in the surrounding environment are limited. In order to ensure that environmental information in the surrounding environment of the vehicle is reliably perceived, sensors on the vehicle need to be reasonably arranged. For example, the arrangement of the sensors should not have a blind area which can threaten the driving safety. Sensors on a vehicle need to be reasonably arranged so as to provide a perception range as large as possible, so that an autonomous driving control unit can reasonably plan a driving path or trajectory of the vehicle. Sensors on the vehicle need to be reasonably arranged to save the number of the sensors and meet limited power supply on the vehicle. Due to limited power supply on the vehicle, the number of power consuming devices that can be installed on the vehicle is limited.

The disclosure discloses a vehicle which can reliably perceive environment information in the surrounding environment and improve the perception ability and environment adaptability of the vehicle (especially an autonomous vehicle) to objects in the surrounding environment.

Figure 1:
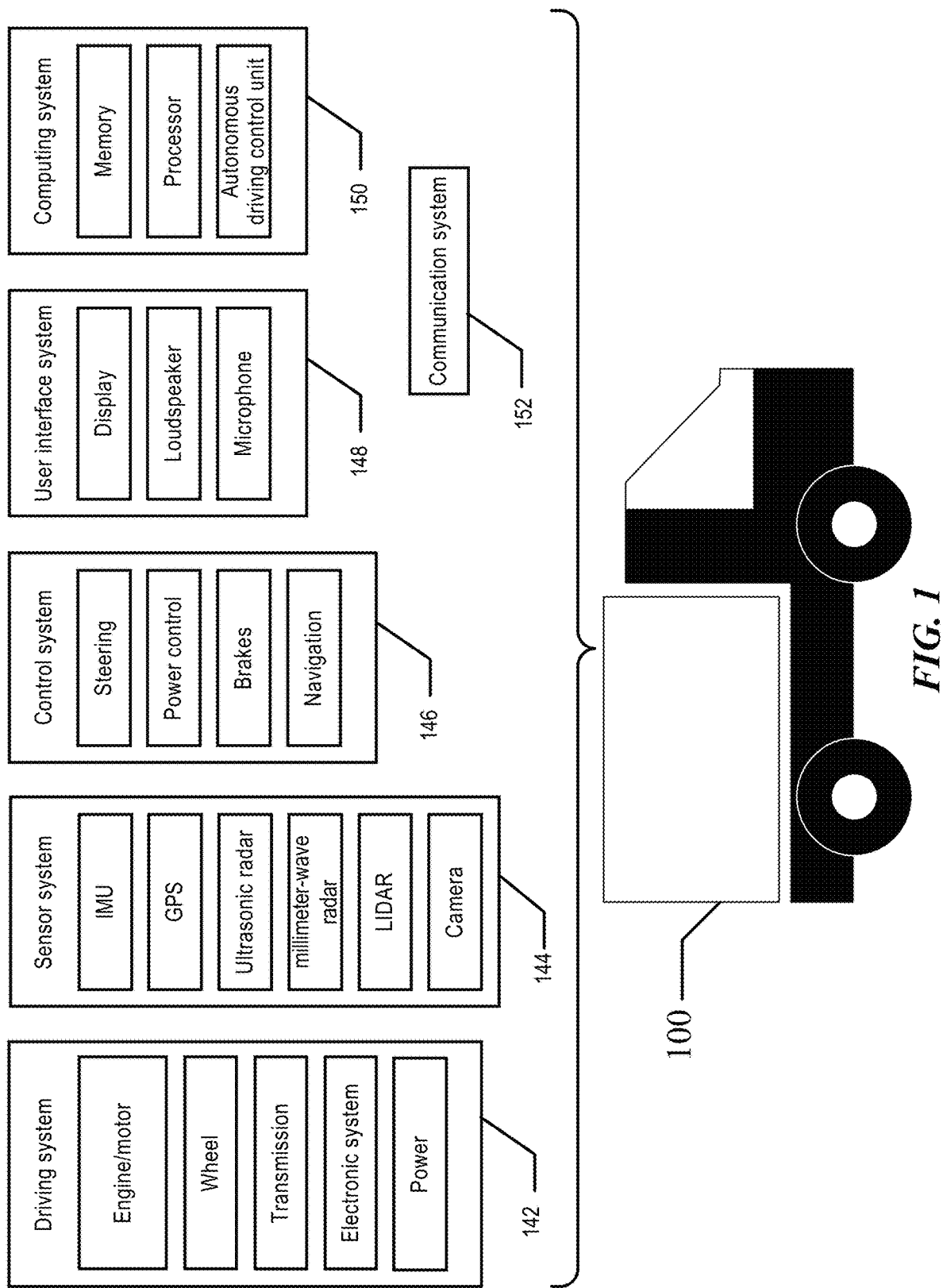
FIG. 1 is a schematic diagram of a vehicle in which various technologies disclosed herein may be implemented.

Referring to FIG. 1 now, FIG. 1 is a schematic diagram of a vehicle 100 in which various technologies disclosed herein can be implemented. The vehicle 100 may be a car, a truck, a motorcycle, a bus, a ship, an aircraft, a helicopter, a mower, an excavator, a motorcycle sled, an aircraft, a travel recreational vehicle, an amusement park vehicle, a farm device, a building device, a tramcar, a golf car, a train, a trolley bus, or other vehicles. The vehicle 100 may be operated fully or partially in an autonomous driving mode. The vehicle 100 may control itself in an autonomous driving mode, for example, the vehicle 100 may determine a current state of the vehicle and a current state of an environment in which the vehicle is located, determine a predicted behavior of at least one other vehicle in the environment, determine a level of trust corresponding to a likelihood that the at least one other vehicle performs the predicted behavior, and control the vehicle 100 itself on the basis of the determined information. While in the autonomous driving mode, the vehicle 100 may be operated without human interaction.

The vehicle 100 may include various vehicle systems, such as a drive system 142, a sensor system 144, a control system 146, a user interface system 148, a computing system 150, and a communication system 152. The vehicle 100 may include more or less systems, each system may include a plurality of units. Further, each of the systems and units of the vehicle 100 may be interconnected. For example, the computing system 150 can be in data communication with one or more of the drive system 142, the sensor system 144, the control system 146, the user interface system 148, and the communication system 152. Thus, one or more described functions of the vehicle 100 can be divided into additional functional components or physical components, or combined into a smaller number of functional components or physical components. In still further examples, additional functional or physical components may be added to the example as shown in FIG. 1.

The drive system 142 may include a plurality of operable components (or units) that provide kinetic energy for the vehicle 100. In one embodiment, the drive system 142 may include an engine or motor, wheels, a transmission, an electronic system, and a power (or power source). The engine or the motor can be any combination of the following devices: an internal combustion engine, an electric motor, a steam engine, a fuel cell engine, a propane engine, or other forms of engines or motors. In some embodiments, the engine may convert a power source to mechanical energy. In some embodiments, the drive system 142 may include a variety of engines or motors. For example, a gasoline-electric hybrid vehicle may include a gasoline engine and a motor, and may also include others.

The wheel of the vehicle 100 may be a standard wheel. The wheels of the vehicle 100 may be in various forms, including a one-wheel, two-wheel, three-wheel, or four-wheel form, such as four wheels on a car or truck. Other numbers of wheels can also be possible, such as six wheels or more wheels. One or more wheels of the vehicle 100 may be operated to differ from the rotational direction of the other wheels. The wheel can be at least one wheel fixedly connected with the transmission. The wheel may include a combination of metal and rubber, or a combination of other substances. The transmission may include a unit operable to transmit mechanical power of the engine to the wheels. For this purpose, the transmission may include a gearbox, a clutch, a differential gear, and a driveshaft. The transmission may also include other units. The driveshaft may include one or more axles that match with the wheels. The electronic system may include a unit for transmitting or controlling electronic signals of the vehicle 100. These electronic signals may be used to start a plurality of lights, a plurality of servo mechanisms, a plurality of motors, and other electronically driven or controlled devices in the vehicle 100. The power source may be an energy source that entirely or partially powers the engine or the motor. That is, the engine or motor can convert the power source into mechanical energy. Exemplary, the power source may include gasoline, petroleum, petroleum-based fuel, propane, other compressed gaseous fuel, ethanol, fuel cells, solar panels, batteries, and other electrical energy sources. The power source may additionally or optionally include any combination of a fuel tank, a battery, a capacitor, or a flywheel. The power source may also provide energy to other systems of the vehicle 100.

The sensor system 144 may include a plurality of sensors for sensing information of an environment and conditions of the vehicle 100. For example, the sensor system 144 may include an inertial measurement unit (IMU), a global navigation satellite system (GNSS) transceiver (e.g., a global positioning system (GPS) transceiver), a radio detection and ranging device (RADAR, referred to as millimeter-wave radar), a laser detection and ranging system (LIDAR), an acoustic sensor, an ultrasonic sensor, and an image capture device (e.g., a camera). The sensor system 144 may also include a plurality of sensors (e.g., an oxygen (O2) monitor, a fuel gauge sensor, an engine oil pressure sensor, and a temperature, humidity, pressure sensor, etc.) for monitoring the vehicle 100. Other sensors can also be configured. One or more sensors included in the sensor system 144 may be driven individually or collectively to update the position, orientation, or both of the one or more sensors.

The IMU may include a combination of sensors (e.g., an accelerator and a gyroscope) for sensing changes in position and direction of the vehicle 100 based on inertial acceleration. The GPS transceiver may be any sensor for estimating the geographic location of the vehicle 100. For this purpose, the GPS transceiver may include a receiver/transmitter to provide position information of the vehicle 100 relative to the earth. It is required to be illustrated that GPS is an example of a global navigation satellite system, and therefore, in some embodiments, the GPS transceiver can be replaced with either a Beidou satellite navigation system transceiver or a Galileo satellite navigation system transceiver. The RADAR unit may use the radio signal to sense an object in an environment in which the vehicle 100 is located. In some embodiments, in addition to sensing the object, the RADAR unit may also be used to sense the speed and heading of an object approaching the vehicle 100. The LIDAR unit may be any sensor that uses lasers to sense objects in the environment in which the vehicle 100 is located. In one embodiment, the LIDAR unit may include a laser source, a laser scanner, and a detector. The LIDAR unit is used to operate in a coherent (e.g., using heterodyne detection) or incoherent detection mode. The image capture device may include a device for capturing a plurality of images of an environment in which the vehicle 100 is located. One example of the image capture device is a camera, which may be a still image camera or a motion video camera.

The control system 146 is used to control operation of the vehicle 100 and its components (or units). Accordingly, the control system 146 may include various units, such as a steering unit, a power control unit, a braking unit, and a navigation unit.

The steering unit may be a combination of machines that adjust the heading of the vehicle 100. The power control unit (for example, the throttle), for example, can be used for controlling the operating speed of the engine, so as to control the speed of the vehicle 100. The braking unit may include a combination of machines for decelerating the vehicle 100. The braking unit may utilize the frictional force in a standard manner to decelerate the vehicle. In other embodiments, the braking unit may convert kinetic energy of the wheels into electrical current. The braking unit can also adopt other forms. The navigation unit may be any system that determines a driving path or route for the vehicle 100. The navigation unit may also dynamically update the driving path during travel of the vehicle 100. The control system 146 may additionally or optionally include other components (or units) that are not shown or described.

The user interface system 148 may be used to allow interaction between the vehicle 100 and external sensors, other vehicles, other computer systems, and/or a user of the vehicle 100. For example, the user interface system 148 may include a standard visual display device (e.g., a plasma display, a liquid crystal display (LCD), a touch screen display, a head-mounted display, or other similar displays), a speaker or other audio output devices, a microphone, or other audio input devices. For example, the user interface system 148 may also include a navigation interface and an interface to control an interior environment (e.g., temperature, fan, etc.) of the vehicle 100.

The communication system 152 may provide the vehicle 100 with a manner to communicate with one or more devices or other surrounding vehicles. In one exemplary embodiment, the communication system 152 may communicate with one or more devices directly or over a communication network. The communication system 152 may be, for example, a wireless communication system. For example, the communication system may use 3G cellular communications (e.g., CDMA, EVDO, GSM/GPRS) or 4G cellular communications (e.g., WiMAX or LTE), and may also use 5G cellular communications. Optionally, the communication system may communicate with a wireless local area network (WLAN) (e.g., using WIFI®). In some embodiments, the communication system 152 may communicate directly with one or more devices or other surrounding vehicles, e.g., using infrared, Bluetooth®, or ZIGBEE. Other wireless protocols, such as various vehicle-mounted communication systems, are also within the scope of the present disclosure. For example, the communication system may include one or more Dedicated Short Range Communication (DSRC) devices, V2V devices, or V2X devices that are in public or private data communication with vehicles and/or roadside stations.

The computing system 150 can control part or all of the functions of the vehicle 100. An autonomous driving control unit in the computing system 150 may be used to identify, evaluate, and avoid or otherwise negotiate potential obstacles in the environment in which the vehicle 100 is located. Generally, the autonomous driving control unit may be used to control the vehicle 100 without a driver, or to provide assistance for the driver to control the vehicle. In some embodiments, the autonomous driving control unit is used to combine data from sensors, such as data from GPS transceivers, RADAR, LIDAR, camera, and other vehicle systems, to determine a driving path or trajectory of the vehicle 100. The autonomous driving control unit may be activated to enable the vehicle 100 to be driven in an autonomous driving mode.

The computing system 150 may include at least one processor (which may include at least one microprocessor) that executes processing instructions (i.e., machine executable instructions) stored in a non-volatile computer-readable medium (e.g., a data storage or memory). The computing system 150 may be composed of a plurality of computing devices that control components or systems of the vehicle 100 in a distributed manner. In some embodiments, processing instructions (e.g., program logic) that are executable by the processor to implement various functions of the vehicle 100 may be included in the memory. In one embodiment, the computing system 150 is capable of data communication with the drive system 142, the sensor system 144, the control system 146, the user interface system 148, and/or the communication system 152. An interface in the computing system is used to facilitate data communication between the computing system 150 and the drive system 142, the sensor system 144, the control system 146, the user interface system 148, and the communication system 152.

The memory may also include other instructions, including instructions for data transmission, instructions for data reception, instructions for interaction, or instructions for controlling the drive system 142, the sensor system 144, or the control system 146, or the user interface system 148.

In addition to storing processing instructions, the memory may store a variety of information or data, such as image processing parameters, road maps, and path information. The information may be used by the vehicle 100 and the computing system 150 during operation of the vehicle 100 in an autonomous, semi-autonomous, and/or manual mode.

Although the autonomous driving control unit is shown to be separate from the processor and the memory, it should be understood that in some implementations, some or all functions of the autonomous driving control unit can be implemented with program code instructions residing in one or more memories (or data storage) and executable by one or more processors, and the autonomous driving control unit can be implemented in some cases by using the same processor and/or memory (or data storage). In some implementations, the autonomous driving control unit may be implemented, at least in part, by using various kinds of dedicated circuit logic, various processors, various field programmable gate arrays ("FPGAs"), various application specific integrated circuits ("ASICs"), various real-time controllers, and hardware.

The computing system 150 may control functions of the vehicle 100 based on input received from various vehicle systems (e.g., the drive system 142, the sensor system 144, and the control system 146), or input received from the user interface system 148. For example, the computing system 150 may control the steering unit by using input from the control system 146 to avoid obstacles detected by the sensor system 144. In one embodiment, the computing system 150 may be used to control aspects of the vehicle 100 and its system.

Although various components (or units) integrated into the vehicle 100 are shown in FIG. 1, one or more of these components (or units) can be installed on the vehicle 100 or individually associated with the vehicle 100. For example, the computing system may be present partially or entirely independently of the vehicle 100. As a result, the vehicle 100 can be present in the form of a separate or integrated equipment unit. The equipment units constituting the vehicle 100 can communicate with each other in a wired communication or wireless communication manner. In some embodiments, additional components or units may be added to each system or one or more components or units may be removed from the system (e.g., the LiDAR or RADAR as shown in FIG. 1).

Figure 2:
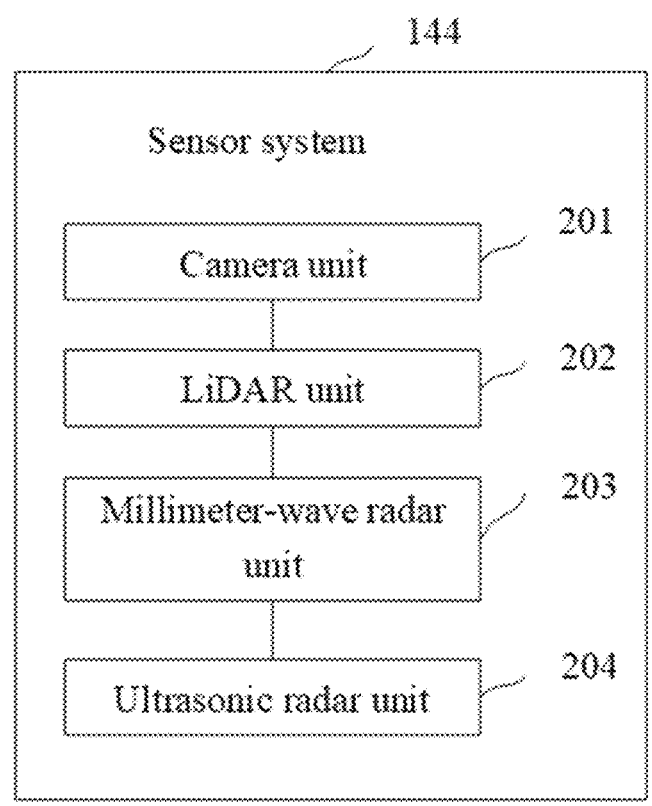
FIG. 2 shows a block diagram of a vehicle sensor system according to an exemplary embodiment.

FIG. 2 illustrates a block diagram of a portion of sensor units of a sensor system 144 in a vehicle 100 that in an exemplary embodiment can realize reliable perception of environmental information in the surrounding environment. The sensor system 144 may include a plurality of sensor units configured to reliably perceive environmental information in the surrounding environment of the vehicle 100 in various driving environments. Some sensor units in the sensor system 144 shown in FIG. 2, for example, include a camera unit 201, a LiDAR unit 202, a millimeter-wave radar unit 203, and an ultrasonic radar unit 204.

The camera unit 201 includes at least one camera which can be configured to detect objects, road conditions, traffic signs, traffic signals, weather conditions and other information related to the trajectory of the vehicle. The camera may be coupled or secured to the vehicle by a nail, a screw, tape, adhesive, welding, soldering, a bolt, or a similar material. In some embodiments, the camera may be coupled or secured to a luggage rack or bracket along the top or bottom of the vehicle. The camera may be coupled or secured to the top, the sides, the front, or the back of the vehicle. The camera may be attached or secured to a front grille, fender, or mirror of the vehicle. The camera may be coupled or secured to any exterior portion of the vehicle.

The camera unit 201 may include a first set of cameras, the first set of cameras include a first subset of cameras, the first subset of cameras may include at least one camera coupled or secured to the vehicle 100 and oriented toward the front of the vehicle 100. That is, the first subset of cameras may be positioned toward the front of the vehicle 100. The first subset of cameras may be configured to have a field of view in front of the vehicle 100. The first subset of cameras may be attached or secured to a luggage rack or bracket on the top of the vehicle. The first subset of cameras may be arranged along an edge of the top of the vehicle 100.

Figure 3:
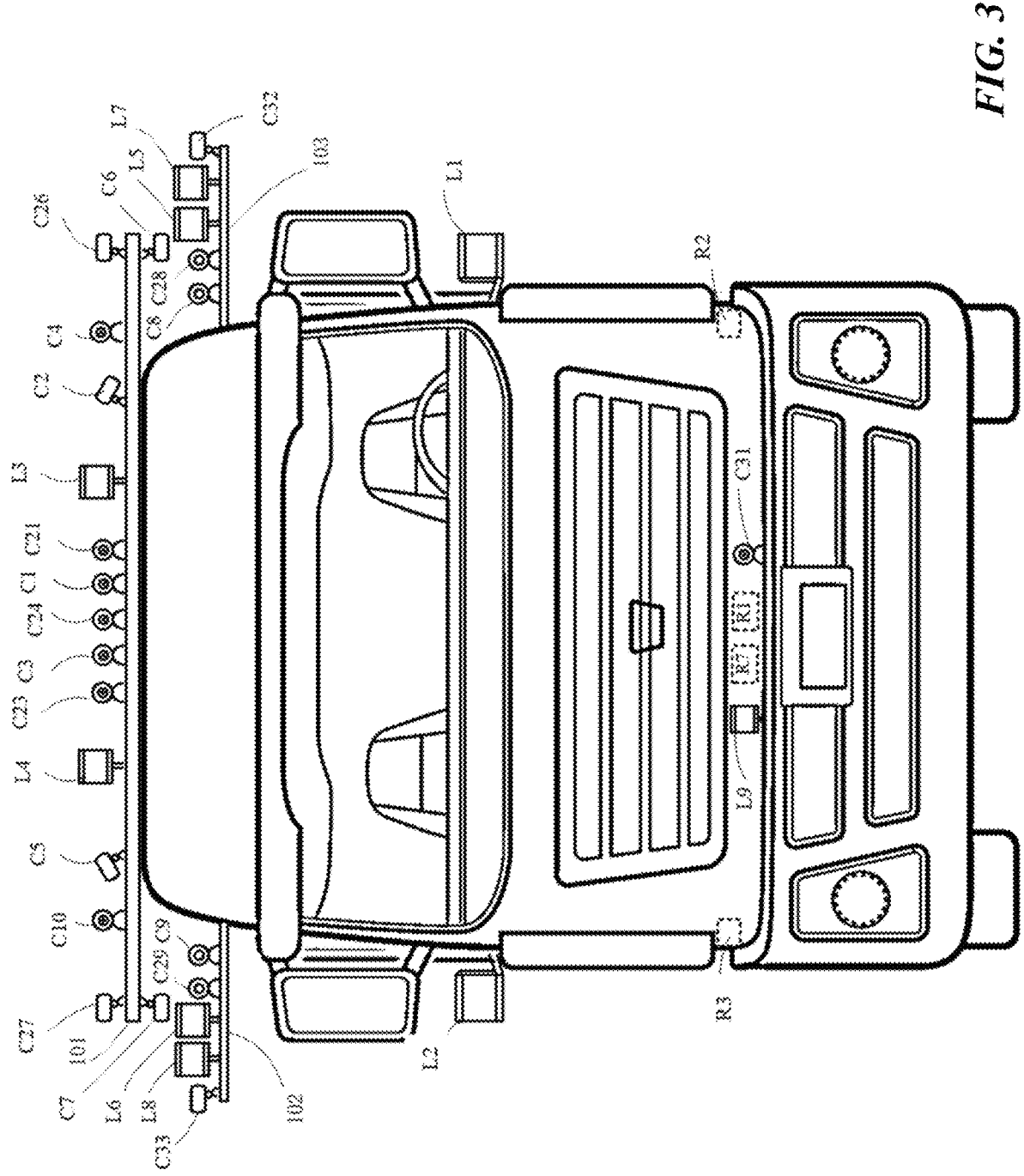
FIG. 3 is a front view of the vehicle, showing a schematic diagram of the sensor arrangement in an example as viewed from the front of the vehicle.
Figure 4:
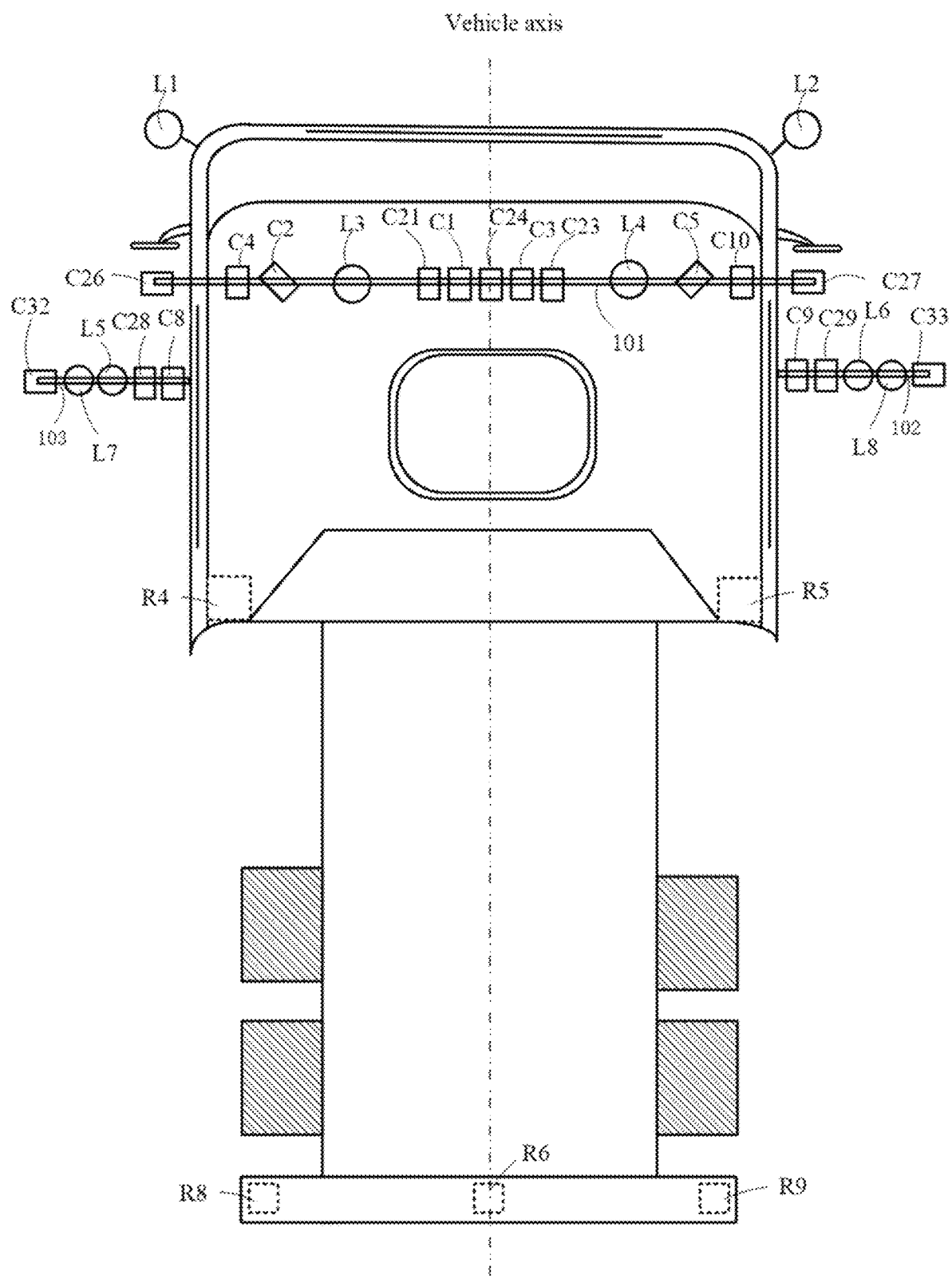
FIG. 4 is a top view of the vehicle, showing a schematic diagram of the sensor arrangement in an example as viewed above the vehicle.

FIG. 3 and FIG. 4 show a specific example of the sensor arrangement as viewed from the front and top of the vehicle, respectively. The first subset of the first set of cameras is arranged on a bracket 101 of the top of the vehicle, with reference to FIG. 3 and FIG. 4, and includes at least two cameras, such as a camera C4 and a camera C10. The camera C4 and the camera C10 may have a focal length of 10 mm-30 mm and face to the front of the vehicle. The camera C4 and the camera C10 can form a binocular system, and the distance (namely the baseline length) between the camera C4 and the camera C10 can be no less than 1 m, or no less than 1.5 m, or no less than 2 m. As a large baseline distance exists between the camera C4 and the camera C10, a large distance measurement range can be achieved. For example, under the condition that the baseline distance between the camera C4 and the camera C10 is 2 meters, the binocular distance measurement capability can reach 300 meters or above. When needed, the camera C4 and the camera C10 can work independently, and at the moment, the distance measurement range of each camera can reach 500 m or above.

The camera unit 201 may further include a second set of cameras, the focal lengths of the second set of cameras are less than the focal lengths of the first set of cameras, the second set of cameras includes a second subset of cameras and a third subset of cameras, the second subset of cameras face to the front of the vehicle 100, and the third subset of cameras face to the side front and/or side of the vehicle 100, wherein the side front can include at least one of the left front and the right front, and the side can include at least one of the left side and the right side.

The second subset of cameras may be configured to have a field of view in front of the vehicle 100. The third subset of cameras may be configured to have a field of view to the side front and/or side of the vehicle 100. The second subset of cameras and the third subset of cameras may be attached or secured to a luggage rack or bracket on the top of the vehicle. The third subset of cameras may be arranged along an edge of the top of the vehicle.

In examples of FIG. 3 and FIG. 4, the second subset of cameras is arranged on the bracket 101 on the top of the vehicle, and includes at least two cameras, such as a camera C1 and a camera C3 facing to the front of the vehicle. The camera C1 may have a focal length of 2 mm to 8 mm, and the camera C3 may have a focal length of 6 mm to 15 mm. In other words, the focal length of the camera C1 is less than the focal length of the camera C3. The third subset of cameras is arranged on the bracket 101 of the top of the vehicle and includes a camera C2 facing towards the left front of the vehicle, a camera C5 facing towards the right front of the vehicle, a camera C6 facing towards the left side of the vehicle and a camera C7 facing towards the right side of the vehicle. The third subset of cameras (e.g., cameras C2, C5, C6, C7) may have a focal length of 2 mm to 8 mm.

It should be noted that, in the present application, facing to the front of the vehicle refers to a direction that is almost parallel to the axis or the heading of the vehicle (the direction in which the vehicle travels linearly forward), facing to the side front of the vehicle refers to a direction that forms an acute angle with the axis or the heading of the vehicle, and facing to the side of the vehicle refers to a direction that is almost perpendicular to the axis or the heading of the vehicle. Facing to the back of the vehicle refers to the direction almost parallel to the axis of the vehicle but opposite to the heading of the vehicle. FIG. 4 shows the axis of the vehicle along which the vehicle is substantially bilaterally symmetrical.

Again, although the solution of the application is explained by taking a tractor (such as a tractor of a truck) as an example in FIG. 3 and FIG. 4, the skilled artisan in the field can understand that the solution of the application is not limited to the tractor, and in some embodiments, the tractor can also be connected with a hanging box, a trailer, a semitrailer, a hanging plate and the like.

The camera unit 201 may further include a third set of cameras, where the focal lengths of the third set of cameras are less than the focal lengths of the second set of cameras, the third set of cameras includes a fourth subset of cameras and a fifth subset of camera. The fourth subset of cameras are positioned toward the front of the vehicle, and the fourth subset of cameras may be configured to have a field of view in front of the vehicle 100. The fifth subset of camera are positioned toward the side front and/or side of the vehicle, wherein the side front may include at least one of the left front and the right front, the side may include at least one of the left side and the right side, and the fifth subset of camera may be configured to have a field of view to the side front and/or side of the vehicle 100.

In some embodiments, the fourth subset of cameras includes at least one camera which is installed on the front of the vehicle and is lower than the first set of cameras and the second set of cameras, and the fifth subset of camera are installed at the positions, close to the top, of the side of the vehicle.

In examples of FIG. 3 and FIG. 4, the fourth subset of cameras is arranged at a lower position on the front of the vehicle, for example including a camera C31, which face outward from the front of the vehicle, and may be a wide-angle camera and has a focal length of 2 mm to 8 mm. However, the focal length of the camera C31 is less than the focal lengths of the cameras C1, C2, C5, C6 and C7 in the second set of cameras. The fifth subset of camera is arranged on the bracket 102 and the bracket 103 and includes a camera C32 facing to the left side of the vehicle and a camera C33 facing to the right side of the vehicle. The cameras C32 and C33 may be wide-angle cameras and have a focal length of 2 mm to 8 mm. However, the focal lengths of the cameras C32 and C33 are less than those of the cameras C1, C2, C5, C6, C7 in the second set of cameras.

In some embodiments, the first set of cameras also includes a sixth subset of cameras, the sixth subset of cameras are positioned toward the back of the vehicle, the sixth subset of cameras may be configured to have a field of view behind the vehicle 100. In some embodiments, the second set of cameras also includes a seventh subset of cameras, the seventh subset of cameras are positioned toward the back of the vehicle, the seventh subset of cameras may be configured to have a field of view behind the vehicle 100. In some embodiments, the third set of cameras also includes an eighth subset of cameras, the eighth subset of cameras are positioned toward the back of the vehicle, the eighth subset of cameras may be configured to have a field of view behind the vehicle 100.

The sixth subset of cameras and the seventh subset of cameras may be attached or secured to the luggage rack or bracket on the top of the vehicle. The sixth subset of cameras and the seventh subset of cameras may be arranged along an edge of the top of the vehicle.

In some embodiments, two cameras may be provided on the bracket 102 and the bracket 103, respectively, as the sixth subset of cameras, which may, for example, have a focal length of 10 mm to 30 mm and face to the back of the vehicle.

In examples of FIG. 3 and FIG. 4, the seventh subset of cameras is arranged on the bracket 102 and the bracket 103 on both sides of the top of the vehicle, including cameras C8 and C9 facing to the back of the vehicle, which may have a focal length of 2 mm to 8 mm.

In some embodiments, the eighth subset of cameras may be wide-angle cameras and has a focal length of 2 mm to 8 mm, and the cameras may be disposed at a middle position of the rear of the vehicle.

In some embodiments, the first, second, and/or third sets of cameras described above are infrared cameras that provide information perception ability for the vehicle at night or in a darker light environment.

In some implementations, the first set of cameras include at least one infrared camera and at least one color camera. In some implementations, the second set of cameras include at least one infrared camera and at least one color camera. In some implementations, the third set of cameras include at least one infrared camera and at least one color camera.

In some implementations, the first, second and/or third sets of cameras described above are configured for perception in daytime or in sufficient light conditions (e.g., being cameras operating in a visible light spectrum). Meanwhile, the first set of cameras, the second set of cameras and/or the third set of cameras further includes at least one infrared camera, and thus the information perception ability at night or in the environment with dark light is provided for the vehicle. The first, second and/or third set of cameras may include one or more infrared cameras arranged towards the front, left front, right front, left side, right side or back of the vehicle. For example, the first subset of the first set of cameras may also include an infrared camera toward the front of the vehicle. The second subset of cameras may also include an infrared camera toward the front of the vehicle, the third subset of cameras may also include an infrared camera toward the side front and/or side of the vehicle, and the seventh subset of cameras may also include an infrared camera toward the back of the vehicle.

For example, as described in FIG. 3, in order to provide perception under night or darker light conditions, the first subset of the first set of cameras may further include an infrared camera C24 arranged on the bracket 101 of the top of the vehicle. The camera C24 may have a focal length of 10 mm to 30 mm (the focal length of the camera C24 may be the same as the focal length of the camera C4 and the camera C10), and faces to the front of the vehicle. The camera C24 can be installed at the middle position of the bracket 101, for example.

As shown in FIG. 3, the second subset of the second set of cameras can further include an infrared camera C21 and an infrared camera C23 which are arranged on the bracket 101 and face to the front of the vehicle. The camera C21 can have a focal length of 2 mm to 8 mm, and the camera C23 can have a focal length of 6 mm to 15 mm. In other words, the focal length of the infrared camera C21 is less than that of the infrared camera C23. The third subset of the second set of cameras may also include an infrared camera C26 toward the left side of the vehicle and an infrared camera C27 toward the right side of the vehicle arranged on the bracket 101 on the top of the vehicle. The seventh subset of the second set of cameras may also include an infrared camera C28 and an infrared camera C29 facing to the back of the vehicle. The cameras C26, C27, C28, C29 may have a focal length of 2 mm to 8 mm.

In some embodiments, the second subset of cameras includes at least two cameras having different focal lengths, for example, a first camera C1 and a second camera C3. The focal length of the first camera is shorter than that of the second camera. The first camera is configured for perceiving environmental information within the range of 10-100 meters in front of the vehicle, the second camera is configured for perceiving environmental information within the range of 100-200 meters in front of the vehicle, and the two cameras are used in cooperation so that the forward perception range of the second subset of cameras includes the range of 10-200 meters in front of the vehicle.

Different focal lengths of the cameras are used for detecting environment information in different distance ranges. The cameras of different focal lengths provide environmental information in different distance ranges. In some implementations, the camera in the focal length range of 2 mm to 8 mm may provide environmental information in the distance range of 5 m to 100 m (i.e., the camera in the focal length range of 2 mm to 8 mm may have a perception range of 5 m to 100 m). In some implementations, the camera in the focal length range of 6 mm to 15 mm may provide environmental information in the distance range of 10 m to 200 m (i.e., the camera in the focal length range of 6 mm to 15 mm may have a perception range of 10 m to 200 m). In some implementations, a camera in the focal length range of 10 mm to 30 mm may provide environmental information in the distance range of 50 m to 1000 m (i.e., the camera in the focal length range of 10 mm to 30 mm may have a perception range of 50 m to 1000 m).

By using the cameras in the first, second and/or third set of cameras described above, environmental perception of the vehicle 100 in most conditions may be achieved. For redundancy or as a supplement (in order to achieve environmental perception in some complex conditions), in addition to the cameras, the vehicle 100 may include sensors such as LiDARs, millimeter-wave radars and/or ultrasonic radars.

For example, the vehicle 100 may also include a LiDAR unit 202 including at least one LiDAR therein, which may be configured to detect objects, road conditions, traffic signs, traffic signals, weather conditions, and other information related to the trajectory of the vehicle. The LiDAR may be coupled or secured to the vehicle by a nail, a screw, tape, adhesive, welding, soldering, a bolt, or a similar material. In some embodiments, the LiDAR may be coupled or secured to a luggage rack or bracket along the top or bottom of the vehicle. The LiDAR may be coupled or secured to the top, the sides, the front, or the back of the vehicle. The LiDAR may be attached or secured to a front grille, fender, or mirror of the vehicle. The LiDAR may be coupled or secured to any exterior portion of the vehicle.

The LiDAR unit 202 may include a first group of LiDARs including at least one LiDAR installed at the top of the vehicle and facing to the front of the vehicle, and at least one LiDAR installed at the position, close to the top, of the side of the vehicle and faces to the back of the vehicle. In some implementations, the first group of LiDARs have a maximum perception distance greater than or equal to 500 m.

For example, in examples of FIG. 3 and FIG. 4, the LiDAR L3 and the LiDAR L4 facing to the front of the vehicle, and the LiDAR L5 and the LiDAR L6 facing to the back of the vehicle are shown in the first group of LiDARs. The LiDAR L3 and the LiDAR L4 can be installed on the bracket 101, and the LiDAR L5 and the LiDAR L6 can be installed on the bracket 102 and the bracket 103.

The LiDAR unit 202 may further include a second group of LiDARs including at least two LiDARs installed on two sides of the front of the vehicle, respectively. In some implementations, the at least two LiDARs are 360-degree rotary LiDARs and are respectively arranged at two junctions of the front of the vehicle and the left and right sides of the vehicle.

For example, in examples of FIG. 3 and FIG. 4, a 360-degree rotary LiDAR L1 and a 360-degree rotary LiDAR L2 which are respectively arranged at two junctions of the front of the vehicle and the left and right sides of the vehicle in the second group of LiDARs are shown, L1 has a 270-degree perception range of the left side and the front side of the vehicle, and L2 has a 270-degree perception range of the right side and the front side of the vehicle. The two LiDARs are used in cooperation, and a perception range of 200 m at 360-degree when the vehicle runs in a straight line can be achieved.

In some implementations, the 360-degree rotary LiDAR can be obtained by splicing a plurality of non-rotary LiDARs. In some implementations, the 360-degree rotary LiDAR can be obtained by splicing 3 to 4 non-rotary LiDARs.

The LiDAR unit 202 may further include a third group of LiDARs including at least two LiDARs installed on two sides of the rear of the vehicle, respectively, at least one LiDAR installed in the middle of the front of the vehicle, and/or at least one LiDAR installed in the middle of the rear of the vehicle.

For example, in examples of FIG. 3 and FIG. 4, two LiDARs L7 and L8 facing to the back of the vehicle in the third group of LiDARs, and a LiDAR L9 installed in the middle of the front of the vehicle facing outward from the front of the vehicle are shown. As shown in FIG. 3 and FIG. 4, the LiDARs L7 and L8 are respectively installed on the bracket 102 and the bracket 103 on two sides of the vehicle close to the top, and the skilled in the art can understand that the LiDARs L7 and L8 can also be installed on other positions of the vehicle, such as two sides of the rear of the vehicle, for example, the LiDARs L7 and L8 are installed beside a millimeter-wave radar R8 and a millimeter-wave radar R9.

In some embodiments, the maximum perception distance of the first group of LiDARs is greater than the maximum perception distance of the second group of LiDARs, and the maximum perception distance of the second group of LiDARs is greater than the maximum perception distance of the third group of LiDARs.

In some implementations, the maximum perception distance of the first group of LiDARs is greater than or equal to 500 m, the perception range of the first group of LiDARs includes a distance range of 50 m to 500 m, the maximum perception distance of the second group of LiDARs is greater than or equal to 150 m, and the perception range of the second group of LiDARs includes a distance range of 50 m to 500 m. The perception range of the second group of LiDARs includes a distance range of 5 m to 150 m, the maximum perception distance of the third group of LiDARs is greater than or equal to 80 m, and the perception range of the third group of LiDARs includes a distance range of 0 m to 80 m.

The vehicle 100 may also include a millimeter-wave radar unit 203 including at least one millimeter-wave radar therein, which may be configured to detect objects, road conditions, traffic signs, traffic signals, weather conditions, and other information related to the trajectory of the vehicle. The millimeter-wave radar may be coupled or secured to a vehicle by a nail, a screw, tape, adhesive, welding, soldering, a bolt, or a similar material. In some embodiments, the millimeter-wave radar may be coupled or secured to a luggage rack or bracket along the top or bottom of the vehicle. The millimeter-wave radar may be coupled or secured to the top, the sides, the front, or the back of the vehicle. The millimeter-wave radar may be attached or secured to a front grille, fender, or mirror of the vehicle. The millimeter-wave radar may be coupled or secured to any exterior portion of the vehicle.

The millimeter-wave radar unit 203 may include a first group of millimeter-wave radars installed on the front of the vehicle. In some implementations, the first group of millimeter-wave radars includes at least one millimeter-wave radar in the middle of the front of the vehicle. For example, in examples of FIG. 3 and FIG. 4, the first group of millimeter-wave radars includes the millimeter-wave radar R1 in the middle of the front of the vehicle.

The millimeter-wave radar unit 203 can further include a second group of millimeter-wave radars, and the second group of millimeter-wave radars include at least two millimeter-wave radars installed on the two sides of the front of the vehicle, at least two millimeter-wave radars installed on the two sides of the rear of a cab of the vehicle and at least one millimeter-wave radar installed in the middle of the rear of the vehicle. The operating frequency of the second group of millimeter-wave radars is lower than that of the first group of millimeter-wave radars. For example, in the examples of FIG. 3 and FIG. 4, the second group of millimeter-wave radars include two millimeter-wave radars R2 and R3 which are respectively arranged right below the LiDARs L1 and L2, a millimeter-wave radar R4 and a millimeter-wave radar R5 which are arranged on the left side and the right side of the rear of the cab of the vehicle, and a millimeter-wave radar R6 which is arranged in the middle of the rear of the vehicle.

The millimeter-wave radar unit 203 can further include a third group of millimeter-wave radars, the third group of millimeter-wave radars include at least one millimeter-wave radar installed in the middle of the front of the vehicle, and the operating frequency of the third group of millimeter-wave radars is lower than that of the second group of millimeter-wave radars. For example, in examples of FIG. 3 and FIG. 4, the third group of millimeter-wave radars include a millimeter-wave radar R7 installed in the middle of the front of the vehicle. In other embodiments, the third group of millimeter-wave radars also include at least two millimeter-wave radars installed on both sides of the rear of the vehicle, for example, a millimeter-wave radar R8 and a millimeter-wave radar R9 installed on both sides of the rear of the vehicle.

The millimeter-wave radars of different operating frequencies are configured to perceive environmental information within different ranges, and in some embodiments, the second group of millimeter-wave radars cooperate with the first group of millimeter-wave radars. The perception distance of the third group of millimeter-wave radars is less than the perception distance of the first and second groups of millimeter-wave radars. In some implementations, the first group of millimeter-wave radars and the second group of millimeter-wave radars are used in cooperation, so that the perception distance is within the distance range of 30 m to 100 m, and the perception distance of the third group of millimeter-wave radars is within the range of 0 m to 80 m.

The vehicle 100 may also include an ultrasonic radar unit 204 including at least one ultrasonic radar therein, which may be configured to detect objects, road conditions, traffic signs, traffic signals, weather conditions, and other information related to a trajectory of the vehicle. The ultrasonic radar may be coupled or secured to a vehicle by a nail, a screw, tape, adhesive, welding, soldering, a bolt, or a similar material. In some embodiments, the ultrasonic radar may be coupled or secured to a luggage rack or bracket along the top or bottom of the vehicle. The ultrasonic radar may be coupled or secured to the top, the sides, the front, or the rear of the vehicle. The ultrasonic radar may be attached or secured to a front grille, fender, or mirror of the vehicle. The ultrasonic radar may be coupled or secured to any exterior portion of the vehicle.

The ultrasonic radar unit 204 can include a plurality of ultrasonic radars located on the front, the sides and the rear of the vehicle, and the ultrasonic radars located on the front, the side and the rear of the vehicle surround the periphery of the vehicle and can annularly perceive environment information around the vehicle. In some embodiments, the perception range of the ultrasonic radar includes a distance range of 0 m to 5 m.

Although in FIG. 3 and FIG. 4, the bracket 102 and the bracket 103 are located on both sides of the vehicle near the top, those skilled in the art can understand that the bracket 102 and the bracket 103 can also be located in other positions, for example, the bracket 102 and the bracket 103 can be located on the top, in one example, the bracket 102 and the bracket 103 are located on positions, closer to the rear of the vehicle than the bracket 101, of the top of the vehicle. When located on the top, the bracket 102 and the bracket 103 can be combined into the same bracket. In addition, those skilled in the art can understand that some of the sensors on the bracket 102 and the bracket 103 can be installed on the bracket 101, and some of the sensors on the bracket 101 can also be installed on the bracket 102 and the bracket 103. For example, the sensors C32 and C33 may be installed on the bracket 101 instead of being installed on the bracket 102 and the bracket 103.

In accordance with some embodiments of the present application, the vehicle described above may be a tractor of a vehicle (e.g., a truck) in which at least some of the sensors is located outside the head (or cab) of the truck.

According to some embodiments of the present application, a trailer, a semitrailer, a hanging box or a hanging plate are also connected behind the tractor, at the moment, an angle sensing unit can also be included, and the angle sensing unit can include at least one of a single-line LiDAR, a multi-line LiDAR and a mechanical encoder which are arranged between the tractor and the trailer, the semitrailer, the hanging box or the hanging plate.

In some implementations, the eighth subset of cameras may include at least one camera disposed at the tail of the trailer, the semitrailer, the hanging box or the hanging plate and facing backward. In some implementations, the third group of LiDARs may include at least one LiDAR disposed at the tail of the trailer, semitrailer, the hanging box or the hanging plate and facing backward. In some implementations, the third group of millimeter-wave radars may include at least one millimeter-wave radar disposed at the tail of the trailer, semitrailer, the hanging box or the hanging plate and facing backward.

Figure 5:
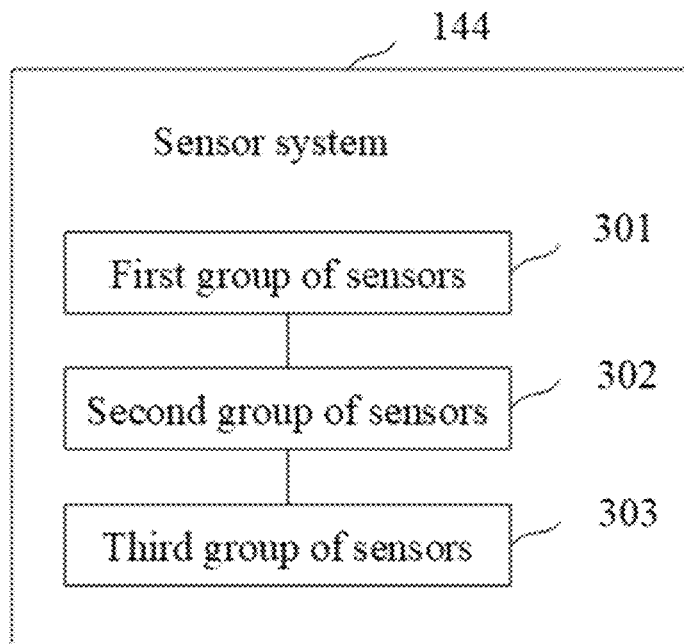
FIG. 5 shows a block diagram of a vehicle sensor system according to another exemplary embodiment.

In some embodiments of the disclosure, different types of sensors of the vehicle can be properly configured and combined to be matched with each other, so that a better perception effect is obtained. For example, an image captured by the camera and LiDAR point cloud data can be fused, so that the perception distance is improved. In addition, by properly matching the cameras, the LiDARs, the millimeter-wave radars and/or the ultrasonic radars, various different environments can be adapted, and appropriate redundancy can be provided. As shown in FIG. 5, the sensors of the sensor system 144 can be divided into a plurality of groups by appropriately configuring different types of sensors, thereby reliably perceiving environmental information in the surroundings of the vehicle 100 in various driving environments. For example, the sensors of the sensor system 144 may be divided into at least the first group of sensors 301, the second group of sensors 302, and the third group of sensors 303.

The first group of sensors 301 are configured to perceive objects within a range less than a first distance and greater than a second distance from the vehicle (e.g., perceiving objects in the range of 50-1000 m), the second group of sensors 302 are configured to perceive objects within a range less than a third distance and greater than a fourth distance from the vehicle (e.g., perceiving objects in the range of 10-200 m), and the third group of sensors 303 are configured to perceive objects within a range less than a fifth distance from the vehicle (e.g., perceiving objects in the range less than 30 m). The first distance is greater than the third distance, the third distance is greater than or equal to the second distance, the second distance is greater than the fourth distance, and the fifth distance is greater than or equal to the fourth distance and less than the second distance and the third distance. The horizontal field of view of the first group of sensors is smaller than or equal to the horizontal field of view of the second group of sensors, and the horizontal field of view of the second group of sensors is smaller than or equal to the horizontal field of view of the third group of sensors. For example, the horizontal field of view of the first group of sensors is smaller than or equal to 90 degrees, or smaller than or equal to 60 degrees, and the horizontal field of view of the second and third groups of sensors is equal to 360 degrees.

In some embodiments, the first group of sensors 301 includes at least one camera and/or at least one LiDAR installed on the top of the vehicle. In some implementations, the at least one camera installed on the top of the vehicle may be the camera in the first set of cameras. In some implementations, at least one LiDAR installed on the top of the vehicle may be the LiDAR in the first group of LiDARs.

In some embodiments, the second group of sensors 302 include one or more cameras, one or more LiDARs, and/or one or more millimeter-wave radars. The cameras are installed on the top and face different directions, at least one of the LiDARs is installed on the vehicle at a position lower than the plurality of cameras and closer to the front of the vehicle, the millimeter-wave radars are installed on the vehicle at positions lower than the cameras, and at least one of the millimeter-wave radars is installed at a position lower than the LiDARs. In some implementations, the cameras included in the second group of sensors may be the cameras in the second set of cameras. In some implementations, the LiDARs included in the second group of sensors may be the LiDARs in the second group of LiDARs. In some implementations, the millimeter-wave radars included in the second group of sensors may be the millimeter-wave radars of the first and second groups of millimeter-wave radars.

In some embodiments, the third group of sensors 303 includes one or more cameras, one or more LiDARs, one or more millimeter-wave radars, and/or one or more ultrasonic radars. At least one camera is installed on the front of the vehicle, at least one camera is installed at the rear of the vehicle, and at least one camera is installed on the top or side of the vehicle; at least one LiDAR is installed on the front of the vehicle, and at least one LiDAR is installed at the rear of the vehicle; at least one millimeter-wave radar is installed on the front of the vehicle, and at least one millimeter-wave radar is installed at the rear of the vehicle.

In some implementations, the cameras included in the third group of sensors may be the cameras in the third set of cameras. In some implementations, the LiDARs included in the third group of sensors may be the LiDARs in the third group of LiDARs. In some implementations, the millimeter-wave radars included in the third group of sensors may be the millimeter-wave radars in the third group of millimeter-wave radars. In some implementation modes, the third group of sensors can include a plurality of ultrasonic radars located on the front, the sides and the rear of the vehicle. The ultrasonic radars located on the front, the sides and the rear of the vehicle surround the periphery of the vehicle and can annularly perceive environment information around the vehicle. In some embodiments, the perception range of the ultrasonic radars includes a distance range of 0 m to 5 m.

In some embodiments, the sensor system may also include an angle sensing unit for measuring an angle between the tractor and the trailer, semitrailer, hanging box or hanging plate.

For the small vehicle, such as a car or a small low-speed transport vehicle, the arrangement of the sensors is relatively easy due to the small volume of the small vehicle. However, a large vehicle (such as a truck) is huge in size, and the length of the large vehicle reaches about 20 m when a trailer, a semitrailer, a hanging box or a hanging plate and the like is installed. In the field of autonomous driving of the large vehicle, the perception ability to objects in the surrounding environment and environment adaptability of the large vehicle are more limited than those of the small vehicle. The sensor layout according to the present disclosure is particularly suitable for the large vehicle, such as the truck.

The embodiment of the disclosure further provides a vehicle sensor layout method described above, including:
providing a first set of cameras, where the first set of cameras includes a first subset of cameras, and the first subset of cameras face to the front of the vehicle,
providing a second set of cameras, where the focal lengths of the second set of cameras are less than those of the first set of cameras, the second set of cameras includes a second subset of cameras and a third subset of cameras; the second subset of cameras face to the front of the vehicle, and the third subset of cameras face to the side front and/or the side of the vehicle, and
providing a third set of cameras, where the focal lengths of the third set of cameras are less than those of the second set of cameras, the third set of cameras includes a fourth subset of cameras and a fifth subset of cameras, the fourth subset of cameras face to the front of the vehicle, and the fifth subset of cameras face to the side front and/or the side of the vehicle.

The embodiment of the disclosure further provides a vehicle sensor layout method described above, including:
providing a first group of sensors, which are configured to perceive objects within a range less than a first distance and greater than a second distance from the vehicle;
providing a second group of sensors, which are configured to perceive objects within a range less than a third distance and greater than a fourth distance from the vehicle; and
providing a third group of sensors, which are configured to perceive objects within a range less than a fifth distance from the vehicle;
where the first distance is greater than the third distance, the third distance is greater than or equal to the second distance, the second distance is greater than the fourth distance, and the fifth distance is greater than or equal to the fourth distance and less than the second distance, and
where the horizontal field of view of the first group of sensors is smaller than or equal to the horizontal field of view of the second group of sensors, and the horizontal field of view of the second group of sensors is smaller than or equal to the horizontal field of view of the third group of sensors.

Figure 6:
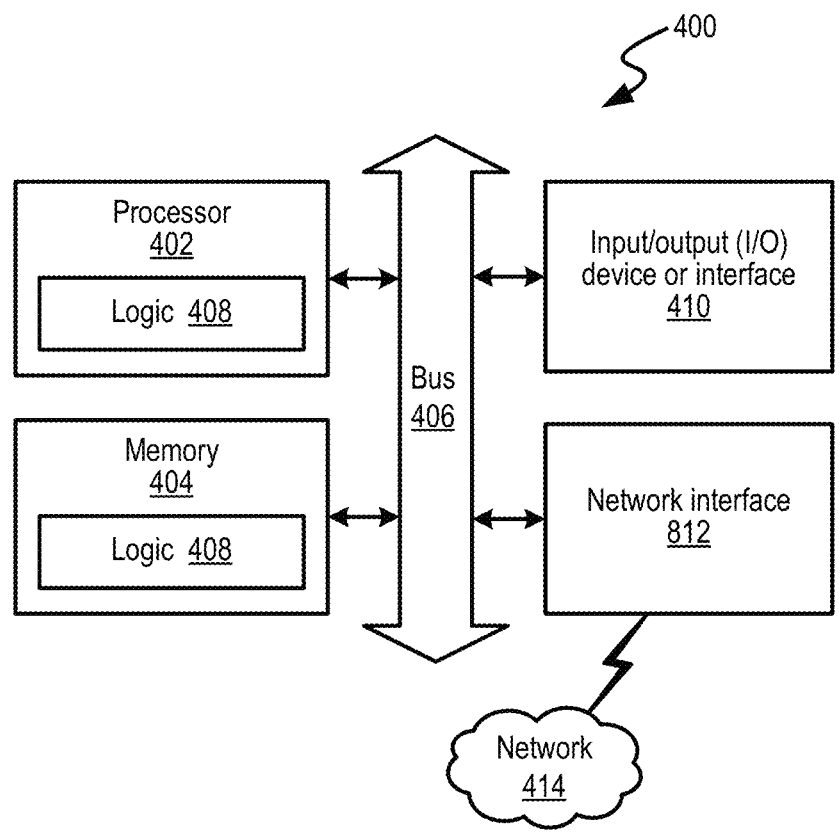
FIG. 6 shows an exemplary machine in the form of a computer system within which an instruction set when executed may cause the machine to execute any one or more of the methods discussed herein.

FIG. 6 shows a representation of a machine in the form of an exemplary computing device 400 within which an instruction set when executed and/or processing logic when started may cause the machine to perform any one or more of the methods described and/or claimed herein. The computing device may be integrated in the vehicle 100, and the computing device 400 may be a computing device in a computing system 150. In alternative embodiments, a machine operates as a stand-alone device, or may be connected (e.g., networked) to other machines. In networked deployment, the machine may operate as a server or client machine in a server-client network environment, or as a peer machine in a peer-to-peer (or distributed) network environment. The machine may be a personal computer (PC), a laptop, a tablet computing system, a personal digital assistant (PDA), a cellular phone, a smartphone, a network application, a set top box (STB), a network router, a switch, or a bridge, or any machine capable of performing an instruction set (successive or otherwise) specifying an action to be taken by the machine or initiating processing logic. Further, although only a single machine is illustrated, the term "machine" may also be understood as any set of machines including an instruction set (or multiple instruction sets) executing individually or jointly to execute any one or more of the methods described and/or claimed herein.

An example computing device 400 may include a data processor 402 (e.g., a system-on-chip (SoC), a general purpose processing core, a graphics core, and optional other processing logic) and a memory 404 (e.g., an internal storage) that may communicate with each other via a bus 406 or other data transfer systems. The computing device 400 may also include various input/output (I/O) devices and/or interfaces 410, such as a touch screen display, an audio jack, a voice interface, and an optional network interface 412. In an exemplary embodiment, the network interface 412 may include one or more radio transceivers and is configured to be used with any one or more standard wireless and/or cellular protocols or access technologies (e.g., second generation (2G), 2.5 generation, third generation (3G), fourth generation (4G) and next generation radio access of a cellular system, global system for mobile communications (GSM), general packet radio service (GPRS), enhanced data GSM environment (EDGE), wideband code division multiple access (WCDMA), LTE, CDMA 2000, WLAN, wireless router (WR) grid, etc.). The network interface 412 may also be configured to be used with various other wired and/or wireless communication protocols (including TCP/IP, UDP, SIP, SMS, RTP, WAP, CDMA, TDMA, UMTS, UWB, WiFi, WiMax, Bluetooth©, IEEE402.11x, etc.). In essence, the network interface 412 may actually include or support any wired and/or wireless communication and data processing mechanism through which information/data may propagate between the computing device 400 and another computing or communication system via the network 414.

The memory 404 may represent a machine-readable medium (or a computer-readable memory medium) on which one or more instruction sets, software, firmware, or other processing logic (e.g., logic 408) are stored that implement any one or more of the methods or functions described and/or claimed herein. During execution by the computing device 400, the logic 408, or a portion thereof, may also reside entirely or at least partially within the processor 402. As such, the memory 404 and the processor 402 may also constitute a machine-readable medium (or a computer-readable memory medium). The logic 408, or a portion thereof, may also be configured as processing logic or logic, at least a portion of which is partially implemented in hardware. The logic 408, or a portion thereof, may also be transmitted or received over a network 414 via the network interface 412. Although the machine-readable medium (or computer-readable memory medium) of an exemplary embodiment may be a single medium, the term "machine-readable medium" (or computer-readable memory medium) should be understood as including a single non-transitory medium or multiple non-transitory media (e.g., centralized or distributed databases and/or associated caches and computing systems) that store one or more instruction sets. The term "machine-readable medium" (or computer-readable memory medium) may also be understood as including any one or more of methods that can store, encode, or carry an instruction set for execution by a machine and cause the machine to perform various embodiments, or any non-transitory medium that can store, encode, or carry a data structure utilized by or associated with such an instruction set. The term "machine-readable medium" (or computer-readable memory medium) may thus be understood as including, but not limited to, a solid state memory, an optical medium, and a magnetic medium.

The disclosed and other embodiments, modules, and functional operations described in this document may be implemented in a digital electronic circuit system, or in computer software, firmware, or hardware (including the structures and structural equivalents disclosed in this document), or a combination of one or more thereof. The disclosed and other embodiments may be implemented as one or more computer program products, that is, one or more modules of computer program instructions encoded on a computer readable medium for execution by a data processing device or for controlling operation of the data processing device. The computer-readable medium may be a machine-readable storage, a machine-readable storage, a memory device, a composition of matter that affects the machine-readable propagation signal, or a combination of one or more thereof. The term 'data processing device' encompasses all devices, apparatuses, and machines for processing data, including, for example, a programmable processor, a computer, or a plurality of processors or computers. In addition to hardware, the device may include codes to create an execution environment for a discussed computer program, such as the codes that constitutes processor firmware, a protocol stack, a database management system, an operating system, or a combination of one or more thereof. The propagation signal is an artificially generated signal, such as an electrical, optical or electromagnetic signal generated by a machine, which is generated to encode information to be transmitted to a suitable receiver device.

A computer program (also referred to as a program, software, a software application, a script or a code) may be written in any form of programming language (including a compilation language or an interpretation language), and the computer program may be deployed in any form, including being deployed as a separate program or as a module, a part, a subroutine or another unit suitable for use in the computing environment The computer program does not have to correspond to a file in the file system. The program may be stored in a portion of a file holding other programs or data (e.g., one or more scripts stored in a markup language document), or in a single file dedicated to the program being discussed, or stored in a plurality of collaboration files (e.g., a file that stores one or more modules, a subprogram, or a portion of codes). The computer program may be deployed to execute on one computer or on a plurality of computers positioned at one site or distributed in a plurality of sites and interconnected over a communication network.

The processes and logic streams described in this document may be executed by one or more programmable processors executing one or more computer programs to perform functions by operating on input data and generating outputs. The processes and logic streams may also be performed by dedicated logic circuitry (e.g., FPGA (Field Programmable Gate Array) or ASIC (Application Specific Integrated Circuit)), and the device may also be implemented as dedicated logic circuitry (e.g., FPGA (Field Programmable Gate Array) or ASIC (Application Specific Integrated Circuit)).

Processors suitable for executing computer programs include, for example, both general-purpose microprocessors and special-purpose microprocessors, as well as any one or more processors of any kind of digital computer. Generally, the processor will receive instructions and data from a read only memory or a random access memory, or both. The necessary elements of the computer are a processor for executing instructions and one or more memory devices for storing instructions and data. Generally, the computer may also include one or more mass storage devices (e.g., magnetic disks, magnetic disks, or optical disks) for storing data, or the computer may also be operatively coupled to receive data from or communicate data to the one or more mass storage devices, or perform both. However, the computer does not need to have such a device. Computer readable media suitable for storing computer program instructions and data include all forms of non-volatile memories, media, and memory devices, including, for example, semiconductor memory devices, such as EPROM, EEPROM, and flash memory devices; magnetic disks, such as internal hard disks or removable disks; magnetic optical discs; and CD-ROM disks and a DVD-ROM disks. The processor and memory may be supplemented by the dedicated logic circuitry or may be incorporated into the dedicated logic circuitry.

Although the patent document contains many details, these details should not be interpreted as limitations on the scope of any disclosure or content that may be required, but are described as features that may be directed to a particular embodiment of a particular disclosure. Certain features described in the patent document in the context of a separate embodiment may also be implemented in combination in a single embodiment. Instead, various features described in the context of a single embodiment may also be implemented in multiple embodiments either alone or in any suitable subcombination. Furthermore, although the above may describe features to function in certain combinations and initially even likewise require those features, in some cases one or more features from the required combination may be deleted from the combination, and the required combination may be directed to a sub-combination or a change to a sub-combination.

Similarly, although operations are depicted in a specific order in the drawings, it should not be understood that such operations need to be performed in the specific order shown or in successive order, or all of the operations shown in the drawings need to be performed to achieve the desired result. In addition, the separation of various system components in the embodiments described in this patent document should not be understood that such separation is required in all embodiments.

Only some implementations and examples are described, and other implementations, enhancements, and variations may be made based on the content described and illustrated in the patent document.

The description of the embodiments described herein aims to provide a general understanding of the structures of various embodiments, and they are not intended to be used as a complete description of all elements and features of components and systems that may utilize the structures described herein. For those skilled in the art, many other embodiments will be apparent after reviewing the description provided herein. Other embodiments may be utilized and derived such that structural and logical substitutions and changes may be made without departing from the scope of the present disclosure. The drawings herein are only representative, and may not be plotted in proportion. Some proportions may be increased while other proportions may be minimized. Therefore, the description and drawings will be considered to be illustrative rather than restrictive.

Some embodiments implement functionality in two or more particular interconnected hardware modules or devices in which related control and data signals are communicated between and through the modules, or as part of an application specific integrated circuit. Thus, example systems are applicable to software, firmware, and hardware implementations.

An abstract of the present disclosure is provided to allow a reader to quickly determine properties of the technical disclosure. It should be understood that the abstract of the present disclosure will not be used to interpret or limit the scope or meaning of the claims. Furthermore, in the foregoing specific embodiments, it may be seen that various features are grouped together in a single embodiment for the purpose of simplifying the disclosure. The method of the present disclosure should not be interpreted as reflecting the intention that the embodiments of the claims require more features than those explicitly described in each claim. In contrast, the subject matter of the present disclosure is fewer than all features of a single disclosed embodiment as reflected by the following claims. Thus, the following claims are incorporated into specific embodiments, and each of the claims itself is a separate embodiment.

Although the foregoing is directed to implementations of the disclosure, other and further implementations of the disclosure can be designed without deviating from the basic range of the disclosure, and the range of the disclosure is determined by the attached claims.

We claim:

1. A vehicle, comprising:
   a first set of cameras, comprising a first subset of cameras facing to a front of the vehicle;
   a second set of cameras, wherein a focal length of the second set of cameras is less than a focal length of the first set of cameras, the second set of cameras comprises a second subset of cameras and a third subset of cameras, the second subset of cameras face to the front of the vehicle, and the third subset of cameras face to a side front or a side of the vehicle;
   a third set of cameras, wherein a focal length of the third set of cameras is less than the focal length of the second set of cameras, the third set of cameras comprises a fourth subset of cameras and a fifth subset of camera, the fourth subset of cameras face to the front of the vehicle, and the fifth subset of camera face to the side front or the side of the vehicle and has a focal length less than a focal length of the third subset of cameras; and
   a first group of LiDARs, comprising at least one LiDAR which is installed at a top of the vehicle and faces to the front of the vehicle,
   wherein the first subset of cameras and the second subset of cameras comprises four cameras in a row having three different focal lengths,
   wherein the first subset of cameras comprises two cameras having a same focal length and lined up with each of the LiDARs, the second subset of cameras and the third subset of cameras on a bracket, and a distance between the two cameras having the same focal length is no less than 1.5 m, and
   wherein each of the second subset of cameras and a LiDAR of the first group of LiDARs is sandwiched between two cameras of the third subset of cameras and between the two cameras of the first subset of cameras.

2. The vehicle according to claim 1, wherein:
   the first set of cameras further comprises a sixth subset of cameras facing to a back of the vehicle;

the second set of cameras further comprises a seventh subset of cameras facing to the back of the vehicle; or the third set of cameras further comprises an eighth subset of cameras facing to the back of the vehicle.

3. The vehicle according to claim 1, wherein the two cameras of the first subset of cameras form a binocular camera.

4. The vehicle according to claim 3, wherein the first set of cameras comprise further an infrared camera having the same focal length as the binocular camera.

5. The vehicle according to claim 1, wherein the first set of cameras and the second set of cameras are installed at a top of the vehicle.

6. The vehicle according to claim 5, wherein the fourth subset of cameras comprises at least one camera installed on the front of the vehicle and having a smaller height than the first set of cameras and the second set of cameras, and the fifth subset of camera are installed at a position, close to the top, of the side of the vehicle.

7. The vehicle according to claim 1,
wherein the second subset of cameras comprises at least two cameras having different focal lengths each of which is less than the focal length of the first subset of cameras.

8. The vehicle according to claim 1, wherein the first group of LiDARs, further comprises
at least one LiDAR which is installed at a position, close to the top, of the side of the vehicle and faces to a back of the vehicle.

9. The vehicle according to claim 8, further comprising:
a second group of LiDARs, comprising at least two LiDARs which are respectively arranged on both sides of the front of the vehicle.

10. The vehicle according to claim 9, further comprising:
a third group of LiDARs, comprising at least one LiDAR which is installed at a position, close to the top, of the side of the vehicle and faces to the back of the vehicle, and at least one LiDAR which is installed on the front of the vehicle.

11. The vehicle according to claim 10, wherein a maximum perception distance of the first group of LiDARs is greater than a maximum perception distance of the second group of LiDARs, and the maximum perception distance of the second group of LiDARs is greater than a maximum perception distance of the third group of LiDARs.

12. The vehicle according to claim 1, further comprising:
a first group of millimeter-wave radars arranged in a middle of the front of the vehicle.

13. The vehicle according to claim 12, further comprising:
a second group of millimeter-wave radars, comprising at least two millimeter-wave radars installed on both sides of the front of the vehicle, at least two millimeter-wave radars installed on both sides of a back of the vehicle, and at least one millimeter-wave radar installed in a middle of the back of the vehicle, wherein an operating frequency of the second group of millimeter-wave radars is lower than an operating frequency of the first group of millimeter-wave radars.

14. The vehicle according to claim 13, further comprising:
a third group of millimeter-wave radars, comprising at least one millimeter-wave radar installed in the middle of the front of the vehicle and at least two millimeter-wave radars installed on both sides of the back of the vehicle, wherein an operating frequency of the third group of millimeter-wave radars is lower than the operating frequency of the second group of millimeter-wave radars.

15. The vehicle according to claim 1,
wherein the fourth subset of cameras comprises at least one camera installed on the front of the vehicle which has a height smaller than the height of the first subset of cameras, the second subset of cameras and the third subset of cameras and has a focal length less than the focal length of each camera of the first subset of cameras, the second subset of cameras and the third subset of cameras.

16. The vehicle according to claim 1,
wherein each subset of the second subset of cameras, the third subset of cameras and the fifth subset of camera comprises a plurality of cameras.

17. A vehicle, comprising:
a first group of sensors, configured to perceive objects within a range less than a first distance and greater than a second distance from the vehicle;
a second group of sensors, configured to perceive objects within a range less than a third distance and greater than a fourth distance from the vehicle; and
a third group of sensors, configured to perceive objects within a range less than a fifth distance from the vehicle;
wherein the first distance is greater than the third distance, the third distance is greater than or equal to the second distance, the second distance is greater than the fourth distance, and the fifth distance is greater than or equal to the fourth distance and less than the second distance, and
wherein a horizontal field of view of the first group of sensors is smaller than or equal to a horizontal field of view of the second group of sensors, and the horizontal field of view of the second group of sensors is smaller than or equal to a horizontal field of view of the third group of sensors,
wherein the second group of sensors comprises a camera facing to a side front or a side of the vehicle, the third group of sensors comprises a camera facing to the side front or the side of the vehicle and having a focal length less than a focal length of the camera of the second group of sensors,
wherein the first group of sensors and the second group of sensors comprises four cameras in a row having three different focal lengths,
wherein the first group of sensors comprises two cameras having a same focal length and at least one LiDAR installed on a top of the vehicle, and a distance between the two cameras having the same focal length is no less than 1.5 m,
wherein the second group of sensors comprises a plurality of cameras lined up with the at least one LiDAR and the two cameras of the first group of sensors on a bracket, and
wherein at least two of the plurality of cameras of the second group of sensors and the at least one LiDAR is sandwiched between the two cameras of the first group of sensors.

18. The vehicle according to claim 17, wherein the plurality of cameras of the second group of sensors are installed on a top of the vehicle and face different directions;
wherein the second group of sensors further comprises:
a plurality of LiDARs, wherein at least one of the plurality of LiDARs is installed at a position of the vehicle lower than the plurality of cameras and closer to a front of the vehicle; or
a plurality of millimeter-wave radars, which are installed at positions of the vehicle lower than the plurality of cameras, wherein at least one of the plurality of millimeter-wave radars is installed at a position of the vehicle lower than at least a subset of the plurality of LiDARs.

19. The vehicle according to claim 17, wherein the third group of sensors comprises:
   a plurality of cameras, wherein at least one of the plurality of cameras is installed on a front of the vehicle, at least one of the plurality of cameras is installed at a back of the vehicle, and at least one of the plurality of cameras is installed at a top or a side of the vehicle;
   a plurality of LiDARs, wherein at least one of the plurality of LiDARs is installed on the front of the vehicle, and at least one of the plurality of LiDARs is installed at the back of the vehicle; or
   a plurality of millimeter-wave radars, wherein at least one of the plurality of millimeter-wave radars is installed on the front of the vehicle, and at least one of the plurality of millimeter-wave radars is installed at the back of the vehicle.

* * * * *